Figure 1:
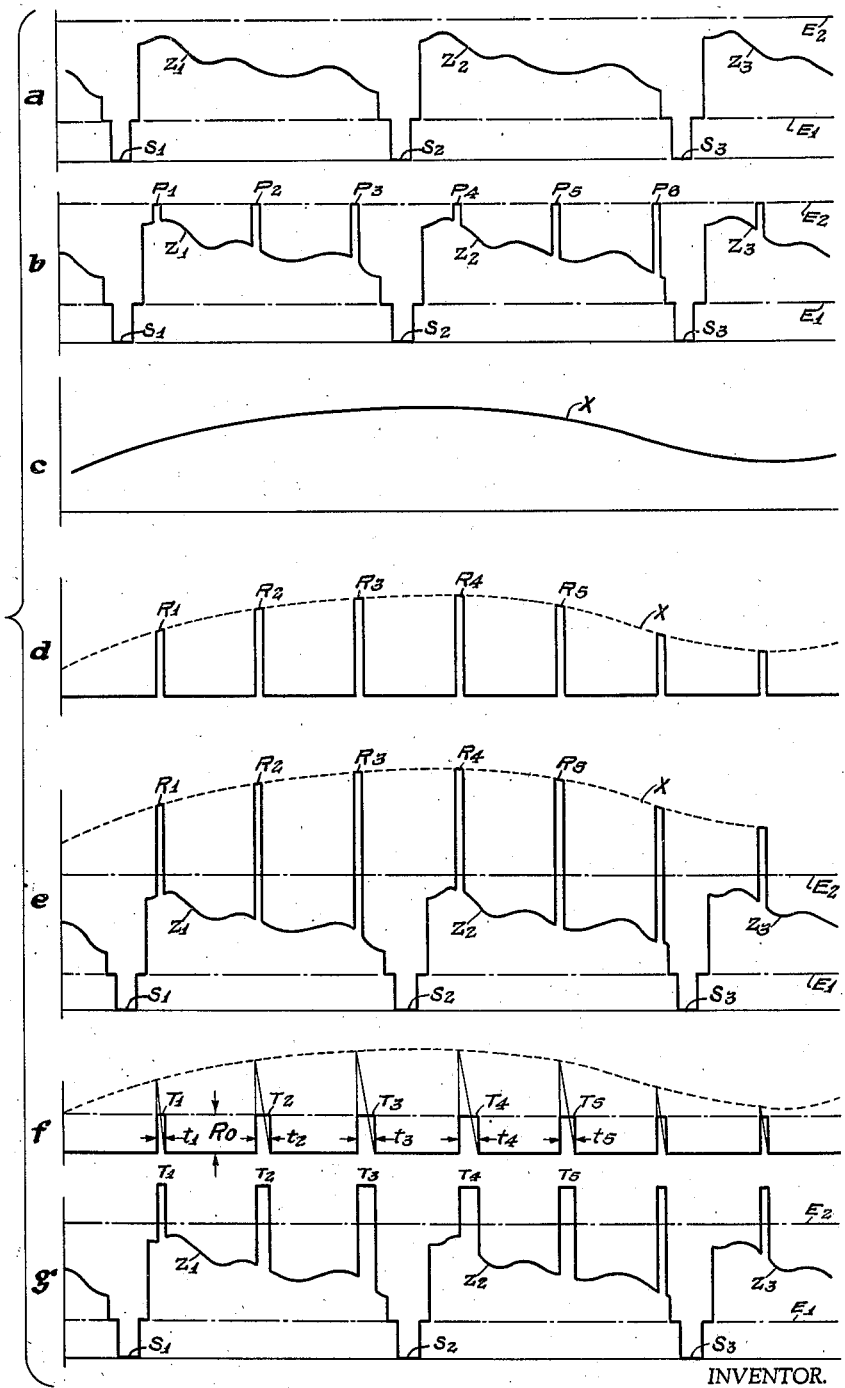

Dec. 16, 1941.    G. GUANELLA    2,266,194
TELEVISION SYSTEM
Filed Jan. 23, 1939    8 Sheets-Sheet 2

INVENTOR.
Gustav Guanella
BY
ATTORNEY

Dec. 16, 1941.    G. GUANELLA    2,266,194
TELEVISION SYSTEM
Filed Jan. 23, 1939    8 Sheets-Sheet 4

INVENTOR.
Gustav Guanella
BY
ATTORNEY

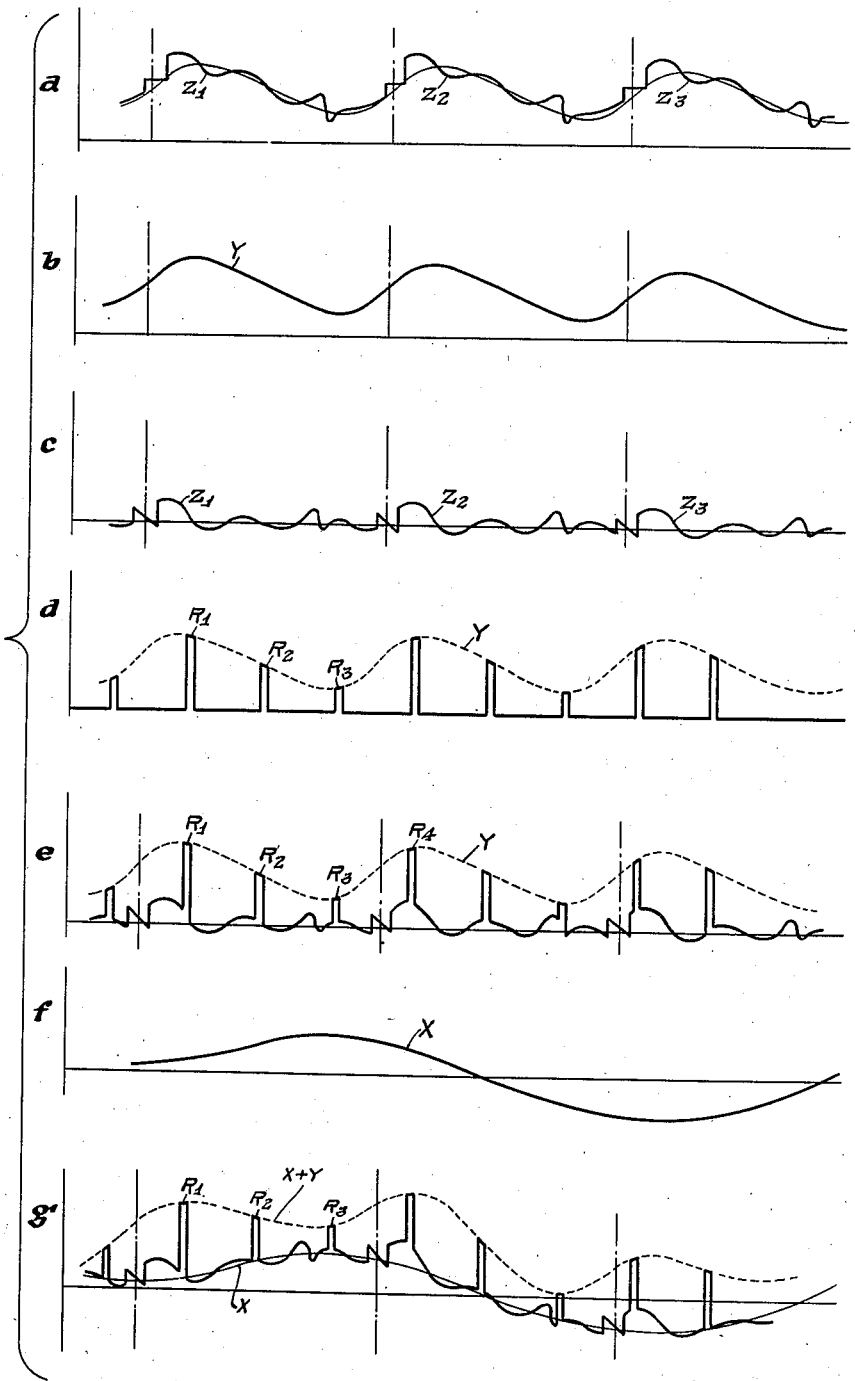

Dec. 16, 1941.    G. GUANELLA    2,266,194
TELEVISION SYSTEM
Filed Jan. 23, 1939    8 Sheets-Sheet 6
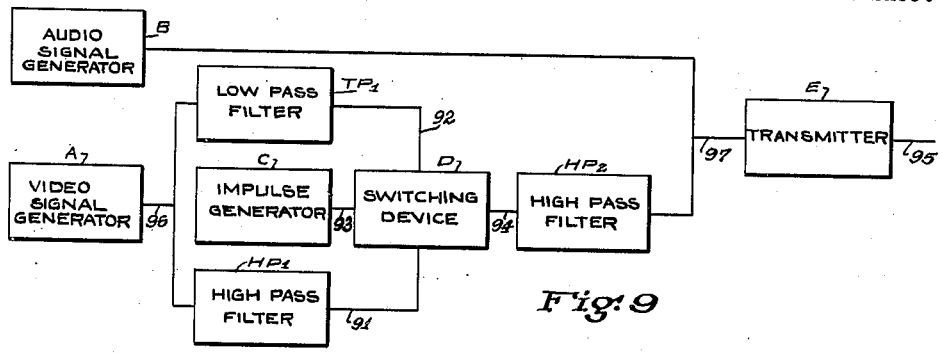
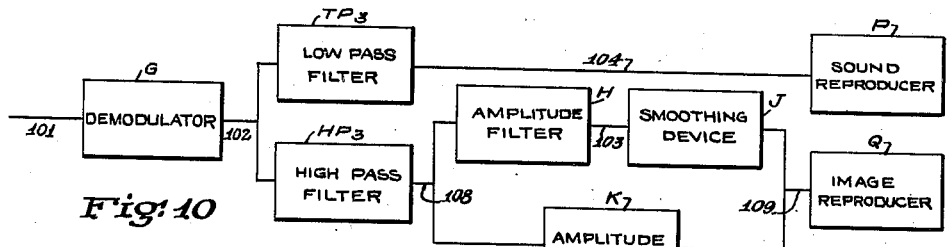
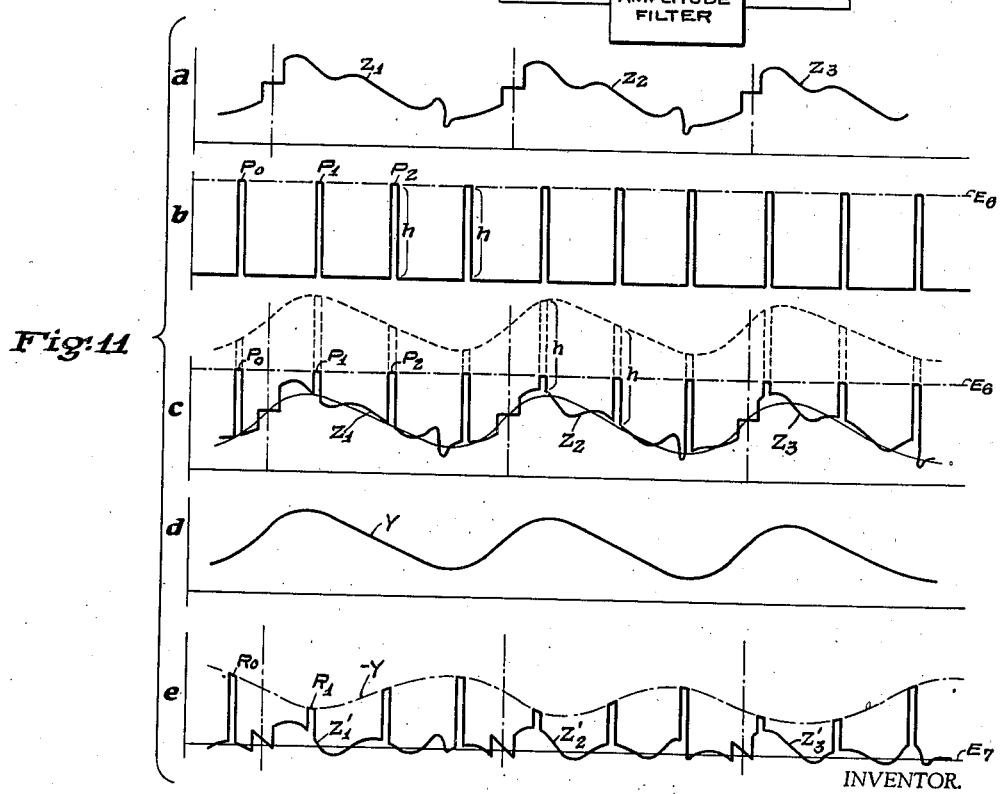
INVENTOR.
BY Gustav Guanella
ATTORNEY.

Dec. 16, 1941.  G. GUANELLA  2,266,194

TELEVISION SYSTEM

Filed Jan. 23, 1939  8 Sheets-Sheet 7

INVENTOR.
Gustav Guanella
BY
ATTORNEY.

Dec. 16, 1941.  G. GUANELLA  2,266,194
TELEVISION SYSTEM
Filed Jan. 23, 1939  8 Sheets-Sheet 8
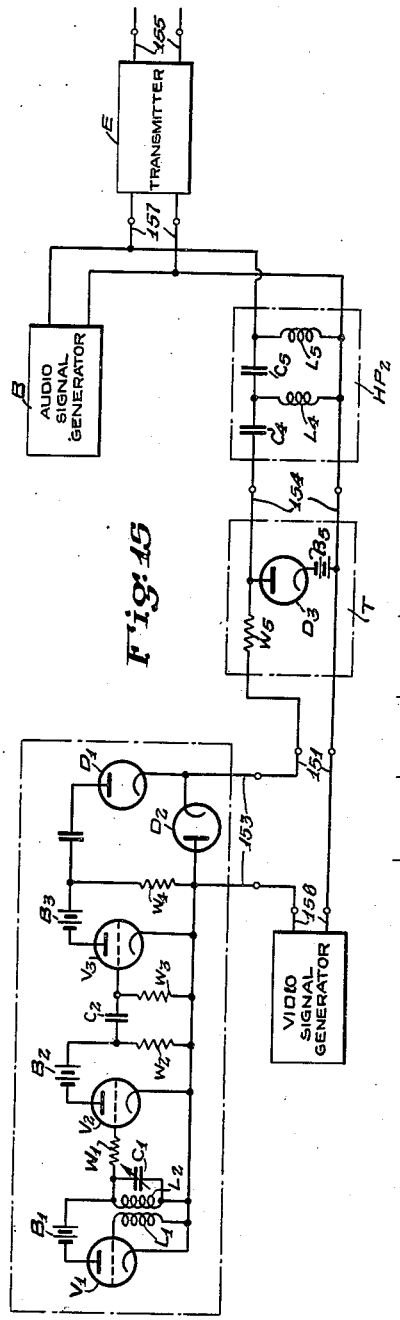
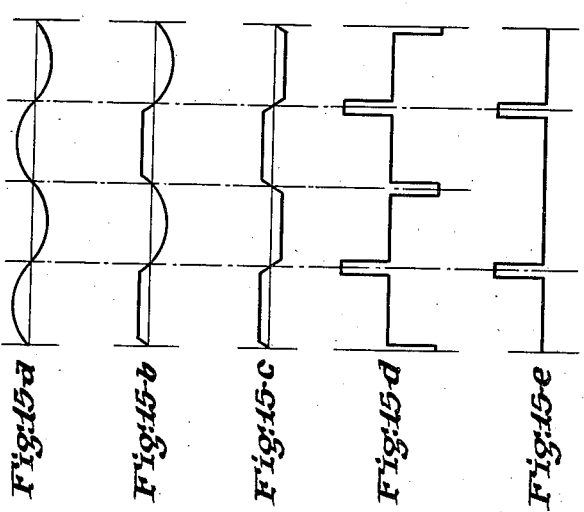
INVENTOR.
Gustav Guanella
BY
ATTORNEY.

Patented Dec. 16, 1941

2,266,194

UNITED STATES PATENT OFFICE 2,266,194

TELEVISION SYSTEM

Gustav Guanella, Zurich, Switzerland, assignor to Radio Patents Corporation, a corporation of New York Application January 23, 1939, Serial No. 252,245
In Switzerland January 30, 1938

10 Claims. (Cl. 178—5.8)

The present application relates to television, more particularly to an improved system for and method of simultaneously transmitting video signals in accordance with an object or scene to be televised synchronously with sound or audio signals such as speech or music accompanying the actions or movements of such object or scene.

As is well known in the art of transmitting television signals, the electrical impulses representing a moving image usually comprise a direct current component and a band of frequencies ranging from a few cycles to several megacycles. In addition to these so-called video signals it is customary to transmit simultaneously sound or audio signals such as speech, music or noises accompanying the action or movement of the object or scene being transmitted. According to known methods of transmission, the video and audio frequency bands are transmitted through separate channels such as individual transmitting lines or cables or by modulation of a pair of carrier waves having different frequencies.

The present invention has for its object to provide a novel method of simultaneously transmitting video and audio signals in television by which separate transmitting channels in the usual sense are dispensed with in such a manner that both the video and audio frequency signals may be transmitted most efficiently and without substantial distortion through a single transmitting channel.

The frequency components to be transmitted are advantageously divided into the following groups for the purpose of the following description and disclosure of the invention:

1. An audio frequency band or signal wave representing the acoustic or sonorous phenomena accompanying the moving object or scene and comprising a range from about 50 to 8000 cycles, 2. A low frequency video frequency range comprising all components below a predetermined limit frequency of the video signals, and 3. A high frequency video frequency range comprising the components above the aforementioned limit frequency.

The limit between the low and high video frequency ranges, groups 2 and 3, may be a frequency of the order of the highest audible frequency, group 1, such as the line sweep frequency employed for scanning the picture or image area when employing the customary horizontal and vertical scanning method.

According to the improvements of the present invention, one of the low frequency groups or signal waves, that is, either the audio signals, group 1, or the lower video frequencies, group 2, are directly transmitted in the ordinary manner through a transmission channel while the remaining low frequency signal wave is transmitted in the form of special pulses having magnitudes corresponding to the momentary values or amplitudes of the respective signal and being superimposed upon or interposed within short interrupting intervals of the high frequency video signal, group 3. A plurality of such pulses are inserted within each line of the image in such a manner as to vary their position from line to line and image to image and to coincide with corresponding short interrupting intervals of the high frequency video signals or the latter combined with the directly transmitted low frequency signals. The low frequencies represented by the superimposed signal pulses are then segregated at the receiver and the received impulses utilized to reconstruct the original low frequency signals.

The invention thus contemplates the transmission of one group of low frequencies such as either the audio frequencies or the lower video frequencies directly through a transmission channel. The other group of low frequencies is transmitted in the form of short signal pulses intercalated within the transmitted signal wave at a frequency of the order that at least three such signal pulses come within each scanning line of the image.

In carrying out the above method it is essential to prevent distortion or other impairment of the transmitted image caused by the short interruptions of the video signals. These interruptions manifest themselves by individual white or dark spots distributed over the image area. If the ratio between the interrupting frequency and the line sweep or horizontal scanning frequency is an irrational i. e., other than integral one, the dots will be distributed irregularly over the entire image area; that is, they will not exhibit a regular geometrical pattern superimposed upon the image, or in other words a so-called Moiree effect will be avoided. Moreover, if the ratio between the pulse frequency and the image sweep or vertical scanning frequency is also irrational, the distribution or pattern formed by the dots will vary with each successive image. With the image frequencies required in practice this change takes place so rapidly that it is impossible to recognize each individual pattern. Moreover, the rapid change of the pattern or distribution of the dots over the image area is further rendered unnoticeable due to the inertia or retentivity effect of the human eye. As a result the dots due to their continuously changing pattern will not appreciably increase the normal flickering or fatigue effect on the observer experienced in case of low image frequencies.

From the foregoing it will be obvious that the impairment of the subjective image sensation by the inserted signal pulses is minimized in proportion to the frequency of the images following each other. Especially advantageous results in employing the present invention are obtained for this reason when using so-called inter-laced scanning characterized in a known manner in a very rapid change of successive, though partial, image areas.

Figure 2:
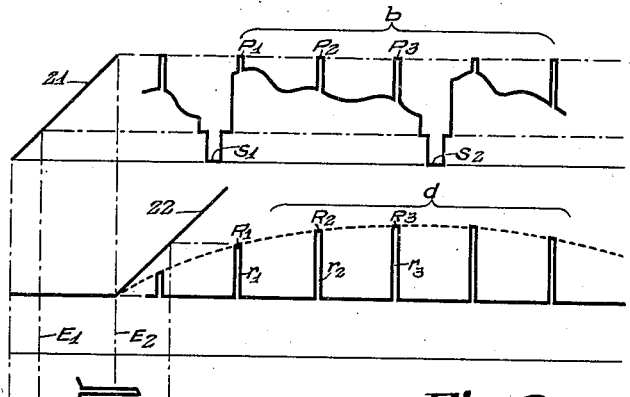
Figure 4:
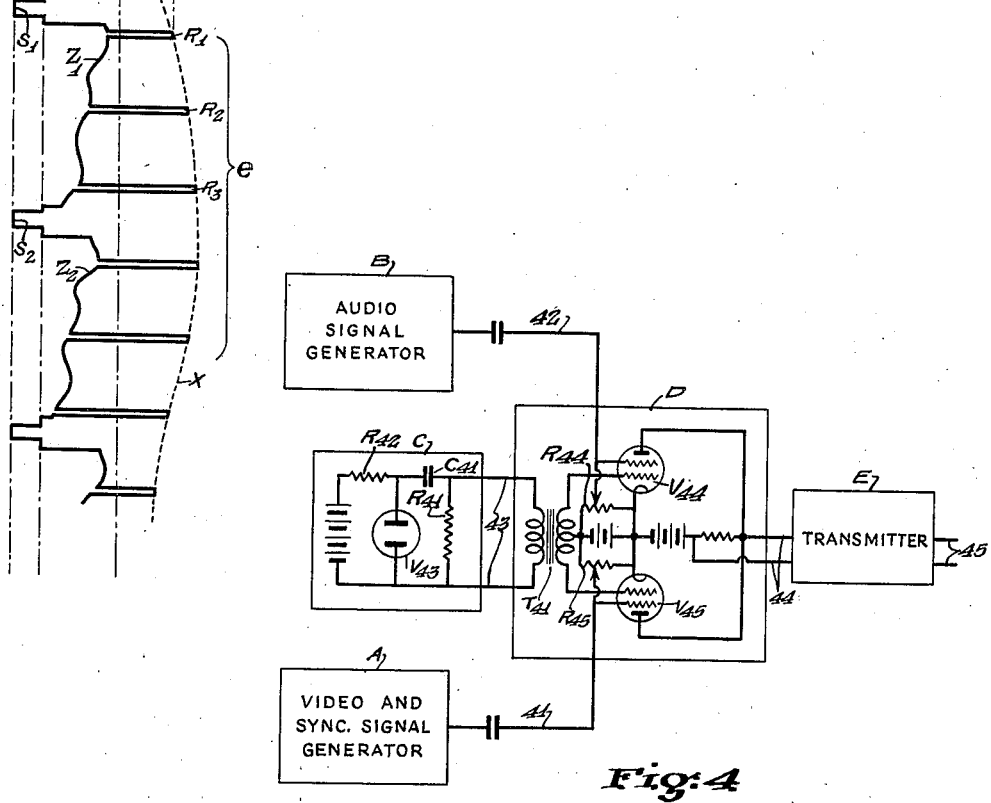
Figure 3:
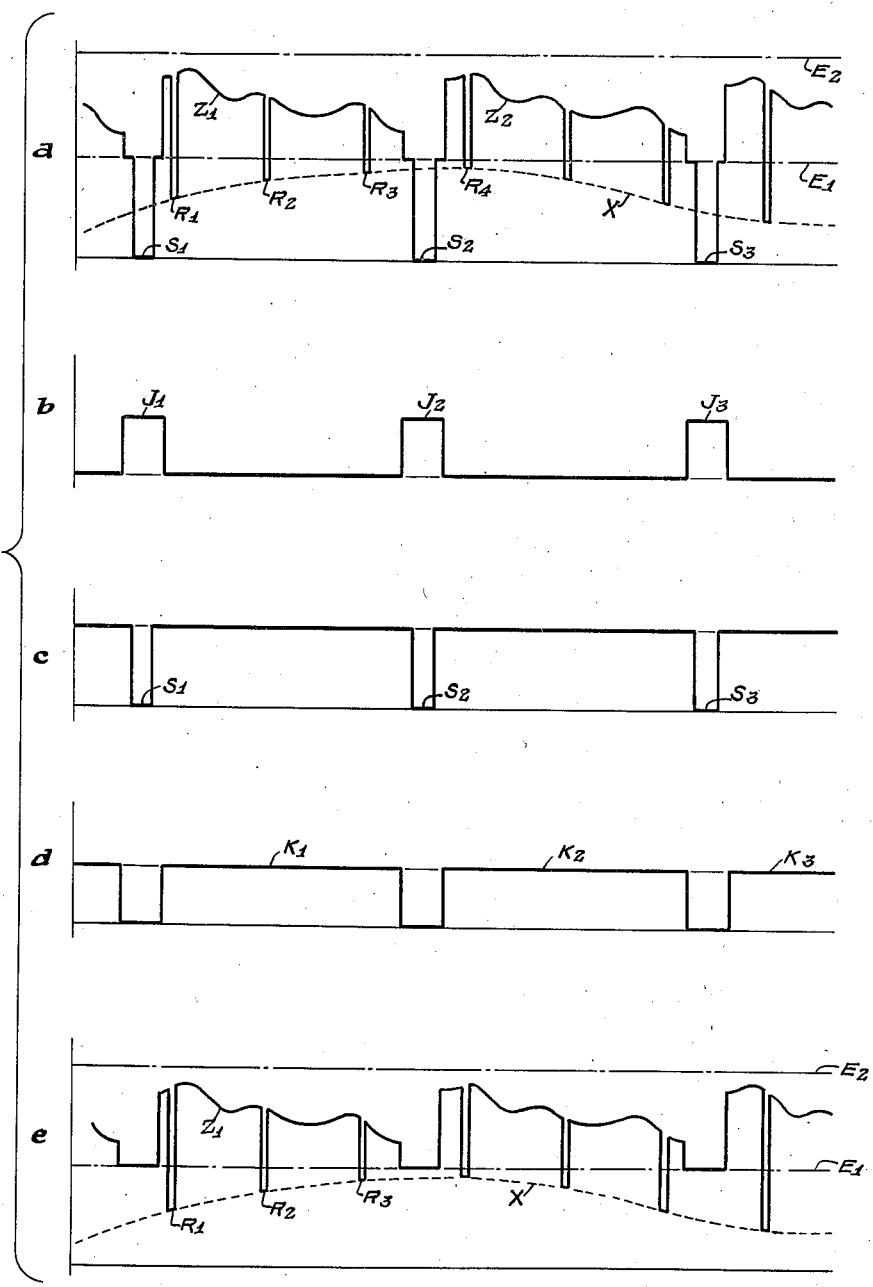
Figure 5:
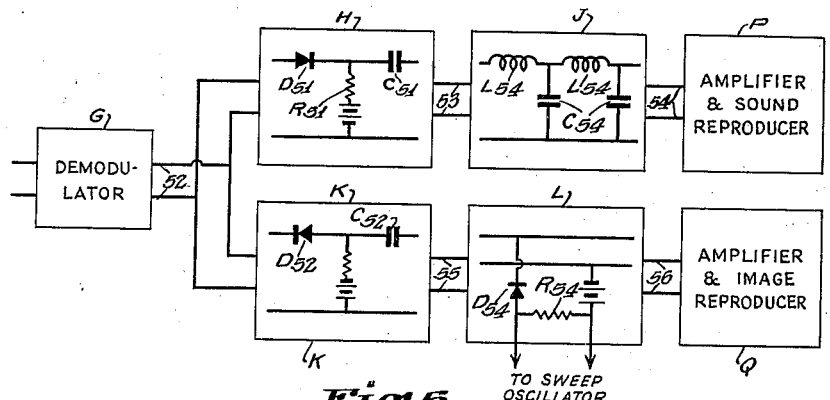
Figure 6:
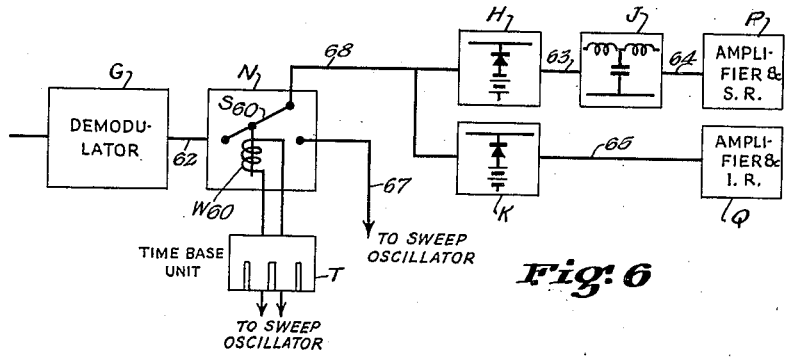
Figure 7:
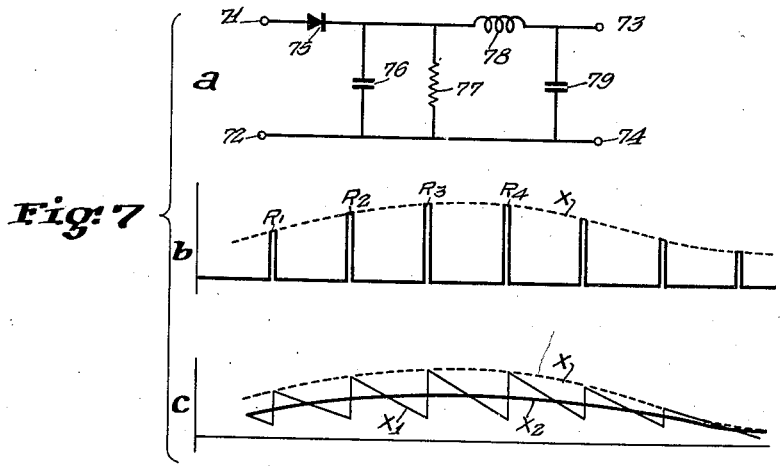
Figure 12:
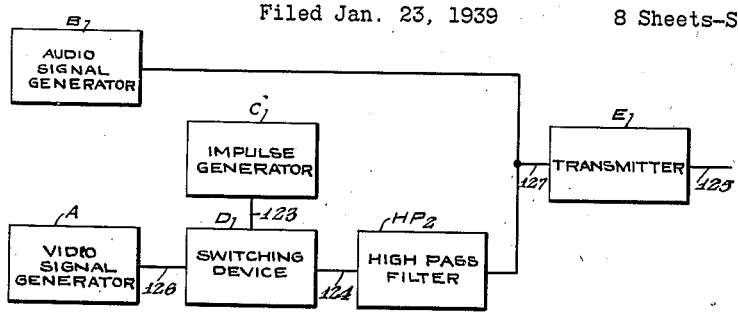
Figure 13:
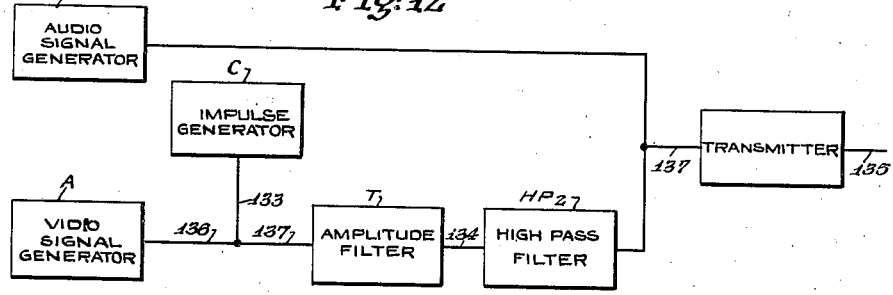
Figure 14:
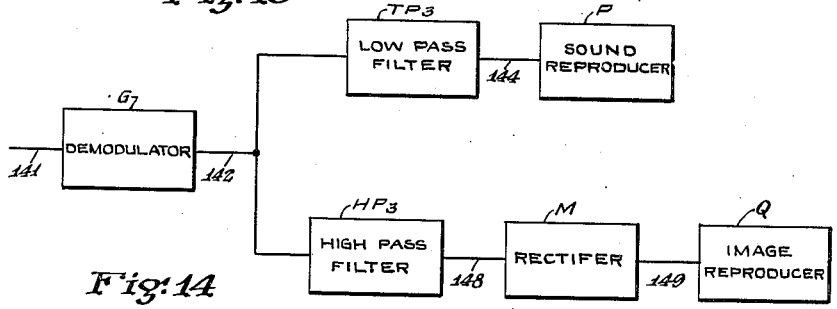

The invention and its objects and novel aspects will become more apparent from the following detailed description taken with reference to the accompanying drawings forming part of this specification and wherein:

Figures 1a to 1g represent theoretical diagrams explanatory of one mode of execution of the inventive method of simultaneous transmission of video and audio signals, Figure 2 shows a theoretical diagram illustrating the separation of the low and high frequency signals at the receiver, Figures 3a and 3d are theoretical diagrams illustrative of an alternative method of separating the low and high frequency signals at the receiver, Figure 4 is a diagram partly in block form of a system for transmitting combined low and high frequency such as video and audio signals according to the method described by Figure 1, Figures 5 and 6 are diagrams partly in block form of systems for separating the signals at the receiver, Figure 7a shows a combined rectifier and filter for, and Figures 7b and 7c are explanatory diagrams illustrating one way of, restoring the audio or low frequency signals at the receiver from the signal pulses used for transmission, Figures 8a to 8g are theoretical diagrams, and Figures 9 and 10 show transmitting and receiving systems, respectively, in block diagram form illustrating an alternative method of combined audio and video signal transmission through a single or limited channel in accordance with the invention, Figures 11a to 11e illustrate a further modification of simultaneous transmission of audio and video signals employing the principle of the invention, Figures 12 and 13 represent transmitting system, and Figure 14 a receiving system, respectively, in block diagram form suited for carrying out the method according to Figures 11a to 11e.

Figure 16:
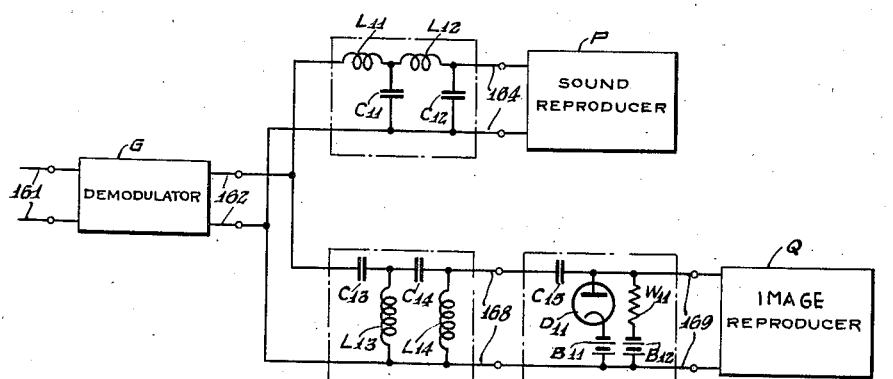

Figures 15 and 16 are complete transmitting and receiving circuit diagrams, respectively, of a system for carrying out the method illustrated by Figures 11a to 11e.

Similar reference characters identify similar magnitudes and parts throughout the different views of the drawings.

Referring to Figure 1a, there is shown a curve or oscillogram representing by way of example a television signal to be transmitted, wherein the ordinates represent signal amplitudes or degrees of brightness and wherein the abscissa represent time in a manner well understood. $z_1$, $z_2$, $z_3$ . . . represent the video signal waves each corresponding to one scanning line. As is understood, the varying ordinates may represent varying image or scene brightness in such a manner that large ordinates correspond to high image brightness or vice versa, the curves may represent a negative image in which case high ordinate values correspond to low degrees of image brightness. The signal values corresponding to extreme degrees of image brightness are indicated by the limiting lines $E_1$ and $E_2$ (black-white limits), i. e. the entire video signal wave will be enclosed between the lines $E_1$ and $E_2$.

$s_1$, $s_2$, $s_3$ . . . represent the synchronizing impulses being constituted in the example shown by definite minimum or maximum values in the oscillogram and in general exceeding the extreme or limit values $E_1$ or $E_2$ of the line signals $Z_1$, $Z_2$, $Z_3$. . . . In Figure 1 the synchronizing impulses are defined by determined pauses or interrupting periods of the image or video signal wave. As pointed out hereinabove, the presence of white or black dots within each line does not appreciably interfere with the subjective perception of the moving image; that is, the oscillogram may have a shape as shown in Figure 1b without impairment of the image quality. In the latter, the peaks of the pulses $P_1$, $P_2$, $P_3$ . . . correspond to a definite maximum or minimum image brightness.

Referring to Figure 1c, there is shown an audio signal wave X to be simultaneously transmitted with the video signals according to Figure 1a. According to the present invention the audio wave X is represented or characterized by short pulses $R_1$, $R_2$, $R_3$ . . . as shown in Figure 1d. The amplitudes $R_1$, $R_2$, $R_3$ . . . of these pulses vary in proportion to the momentary magnitudes of the audio signal X and the pulses follow each other at a frequency which is a multiple of the highest audio frequency to be transmitted. At the receiver the original audio wave may be reconstructed from the pulse signals $R_1$, $R_2$, $R_3$ . . . in the manner described hereafter. Alternatively, the pulses may be of constant amplitude $R_0$ but varying length corresponding to the respective momentary magnitudes of the audio signal such as shown in Figure 1f by the pulses $T_1$, $T_2$, $T_3$ . . . having lengths $t_1$, $t_2$, $t_3$ . . .

According to the present invention the video signals according to Figure 1a and the audio signals according to Figure 1c are transmitted simultaneously by inserting signal pulses according to Figure 1d characteristic of the audio signals within or superimposing them upon corresponding synchronous interrupting intervals of the video signals, Figure 1b, as shown by the combined diagrams, Figures 1e or 1g, respectively.

The combined signals after transmission through an appropriate channel may be separated at the receiver by any known means such as an amplitude filter or clipping device by separating the signals above and below a definite limit such as $E_2$ in Figures 1e or 1g to restore the separate signals according to Figures 1b and 1d.

Referring to Figure 2 there are shown the characteristics of amplitude filters of this type. There is provided a first filter having an operating characteristic 21 and serving to segregate the image or video signal b from the received combined signal e shown in the lower portion of the diagram. In addition there is provided a further amplitude filter having a characteristic 22 for segregating the sound or audio pulses d. The video signal may be further separated from the synchronizing impulses $s_1$, $s_2$, $s_3$ in a known manner by means of an additional amplitude filter or in any other manner well known. The thus obtained video signals may then be applied directly to an image reproducer while the pulses $d$ after adequate filtering or smoothing and eventual elimination of synchronizing frequencies are utilized to reconstruct and restore the original audio wave X, Figure 1c.

It will be understood from the foregoing that the mutual intercalation of the video and audio signals may also be carried out by corresponding deflections below the lower extreme limit represented by line $E_1$ in Figures 1a or b (see Figure 3a).

The separation of the audio signal pulses and the synchronizing impulses at the receiver is greatly facilitated if both impulses are of opposite sense; that is, if for instance the synchronizing impulses have comparatively small ordinate values and the audio signal pulses have comparatively large ordinate values or peaks such as shown in Figures 1e or 1g or alternatively, if the synchronizing impulses have comparatively high ordinate values or peaks and the audio signal pulses are of comparatively small magnitude. However, practical results are also obtained if both kinds of impulses have the same sense or direction. In the latter case a separation of the audio or synchronizing impulses by special amplitude filters may be dispensed with in certain cases if care is taken to prevent inadmissible interference with the synchronism due to the effect of the audio signal pulses upon the synchronizing impulses.

Alternatively, interference of the audio signal transmission by the synchronizing impulses or disturbance of the synchronism by the audio signal pulses may be avoided by the employment of a relay operating synchronously with the line sweep deflection, such relay opening the transmission channel within each line $Z_1$, $Z_2$, $Z_3$ ... Figure 1a, on the one hand and opening the transmission channel for the synchronizing impulses immediately prior to and during the synchronizing periods on the other hand as illustrated in Figures 3a to 3e. Referring to the latter, the received signal is shown in Figure 3a wherein contrary to Figure 1, the audio signal pulses and the synchronizing impulses occur in the same direction relative to the video signal, $Z_1$, $Z_2$, $Z_3$ ... representing the video signal, $s_1$, $s_2$, $s_3$ ... representing the synchronizing intervals and $R_1$, $R_2$, $R_3$ ... representing the signal pulses characteristic of the audio signal. $E_1$ and $E_2$ correspond to the extreme values (black and white limit) of the video signal. A first channel of the receiver (synchronizing channel) is connected by a suitable relay operating at a sequence as shown at Figure 3b (closing intervals $I_1$, $I_2$, $I_3$ ... in such a manner that the synchronizing signals $s_1$, $s_2$, $s_3$ ... are impressed upon this channel and may be applied to a sweep frequency generator for producing deflecting potentials in a cathode ray tube receiver in a manner well known in the art. A further relay operating at a sequence as shown in Figure 3d (closing intervals $K_1$, $K_2$ $K_3$ ... ) serves to effect a separation between the video signals $z_1$, $z_2$, $z_3$ ... and the audio signal pulses $R_1$, $R_2$, $R_3$ ... Figure 3e, which latter may be further separated from each other by means of an amplitude filter in a manner similar as described hereinbefore.

Referring to Figures 4 to 7 there are shown partly in block diagram form systems for carrying out the above described method of transmitting and receiving audio signals in the form of pulses superimposed upon the video signals. In Figure 4 relating to the transmitter, item A collectively represents the system for generating video signals which may be of standard construction and comprise the necessary apparatus such as scanning devices, amplifiers and additional auxiliary equipment well known in the art. The video signals produced by A which may be of the type shown in Figure 1a are impressed through a suitable coupling circuit indicated by a simple line 41 upon a switching device D. Item B represents the generator for the audio signals comprising in a known manner a microphone, amplifier, volume control and other auxiliary equipment of standard type. The audio signal currents which may have a form X as shown in Figure 1c are also impressed through line 42 upon the switching device D. Item C represents an impulse generator serving to generate short current peaks or impulses in regular or irregular cycles which impulses serve to control the switching device D through connecting line 43 in such a manner that the audio signal generator B is connected to line 44 during the impulse period, while the video signal generator A is connected to the line 44 during the relatively longer intervals between the individual impulses. The impulse generator C is adjusted in such a manner that a large number of impulses occur within each scanning line of the video signal whereby a signal of the type shown in Figure 1e will appear at the output 44 of D which signal in the manner described contains all the video signal components according to Figure 1a as well as the audio signal according to Figure 1c. If the impulses produced by the generator C occur in regular sequence provision should be made that the ratio of the fundamental impulse frequency both to the line sweep and image sweep frequencies is irrational in order to prevent regular interference with the image as explained hereinabove. The combined signal may be impressed through 44 directly upon a wide band transmitting channel such as a concentric cable or it may serve to modulate the carrier wave of a transmitter E which latter may be in turn connected to a line or to an antenna through a coupling circuit or line 45 for either directed transmission or transmission through space, respectively.

The impulse generator C may consist of a relaxation oscillator of known construction. Such relaxation oscillators usually comprise one or more electronic tubes connected with resistances and capacity or inductance elements and are well known in television and allied fields of high frequency engineering. Thus, in the example shown, the impulse generator takes the form of a well-known relaxation oscillator comprising a gas discharge tube $V_{43}$ shunted by a condenser $C_{41}$ in series with a load resistance $R_{41}$. In operation, the condenser is charged through resistance $R_{42}$ from a battery or equivalent current source until reaching the breakdown potential of the tube thereby causing a gaseous discharge to be initiated through the latter. This phenomenon will be repeated periodically. During each discharge a short current impulse passes through the load resistance $R_{41}$, resulting in an impulse potential being developed across the latter. The impulses are applied by way of a transformer $T_{41}$ to the switching device D. According to a simplified method, the impulses may be produced from sinusoidal oscillations by the aid of non-linear circuit elements such as by eliminating the upper peaks of a sinusoidal wave by means of an amplitude filter or limiting device.

The switching device D advantageously consists of an arrangement free from mechanically moving elements in view of the high pulse frequencies required in accordance with the invention. Thus, the device D may have the form of an electronic relay controlled by the impulses of the generator C. Such electronic relays are well known in the art especially in the electric measuring technique for simultaneously recording two or more phenomena by a cathode ray oscillograph. For instance, a relay of this type may comprise two electron tubes having their anodes connected to the common output and having their control grids energized alternately by the audio and video signal potential, respectively, to be transmitted. The gain or amplification of both tubes is controlled in push-pull by the impulses supplied from the generator C and impressed upon the control grids or upon separate auxiliary grids of the tubes in phase opposition in such a manner as to effect alternate transmission of both signals through either tube. The electronic switching arrangement shown comprises a pair of relay tubes $V_{44}$ and $V_{45}$ having a common output circuit coupled with the transmitter E in any suitable manner indicated by the direct coupling lines 44. During the interval between two impulses the inner control grid of tube $V_{44}$ is negative whereby this tube will block the sound signals applied from line 42. During the control impulses tube $V_{44}$ will pass current whereby the sound signals will be amplified and applied to the transmitter E by way of line 44. On the other hand, the picture and synchronizing signals produced in A will be amplified by the tube $V_{45}$ during the periods between successive impulses and impressed upon the transmitter E. Since the control impulses for tube $V_{45}$ are of opposite polarity this tube will pass current during the impulse periods. Consequently, the video and audio signals will be superimposed in the manner shown by Fig. 1e. Voltage dividers $R_{44}$ and $R_{45}$ serve to adjust the amplitude of the video and audio signals in such a manner that the weakest audio signal is always stronger than the strongest picture signal to enable an efficient separation of the signals in the receiver in a manner explained in connection with Fig. 2.

According to a modification of the above described method, the low frequency such as audio signals may be represented by the length or duration of signal pulses having a constant amplitude and following each other in rapid sequence as shown in Figures 1f and 1g. Such pulses may for instance be generated by employing methods well known in picture telegraphy known as time modulation methods with the distinction, however, that in the case of the invention the duration of the pulses is determined not by the image brightness as in the known systems but by the momentary value of the audio signal wave (see Telefunken-Zeitung vol. 16, 1935, #70, pg. 35, etc. and Elektr. Nachrichtentechnik, 1932, pg. 51). As is understood, it is possible to vary the length of the impulses with constant intervals therebetween or vice versa to vary the intervals with constant duration of the pulses in proportion to the respective magnitudes of the low frequency such as audio wave. In this latter case it is understood that the centers of the pulses are no longer at a constant distance from each other.

In all the above cases representing the different types of time modulation, the audio signal supplied by the generator B according to Figure 4 is directly applied to the impulse generator C instead of to the switching device D whereby the length of the impulses or the intervals therebetween or both will be controlled corresponding to the respective momentary values of the audio signal. The time modulated impulses of this generator are then impressed through 43 upon the switching device D which latter causes the video signal supplied through 41 and a determined constant potential to be applied alternately to the output 44 and the transmission channel in dependence upon the shape and in the rhythm of the impulses produced by the generator C.

It will be obvious from the foregoing that for efficiently carrying out the inventive method the audio or other low frequency signal pulses should have a duration which is small compared with the intervals between them. This requirement should be fulfilled without deviating from the principle of time modulation.

The separate restoration of the video and audio signals from the combined received signal may be carried out by the aid of apparatus of the type principally illustrated in Figure 5. If the combined signal is transmitted by modulation of a carrier wave such as in the case in radio transmission the received modulated oscillations are applied through an input 51 to a receiver and demodulator G whereby through rectification or any other suitable demodulation there is obtained the combined signal of the type as shown in Figures 1e or 1g. If the transmission is carried out directly without modulation the device G may be dispensed with and the received signals impressed directly preferably through an amplifier upon the input 52. Item H represents an amplitude filter which may have a characteristic of the type shown at 22 in Figure 2 comprising a rectifier $D_{51}$ in series with a resistance $R_{51}$ and a biasing battery, the latter providing a potential which corresponds to the limit amplitude $E_2$ according to Fig. 2, as described further on page 5, col. 1, line 60. Thus, current will flow through the rectifier and the series resistance $R_{51}$ if the signal potential is greater than $E_2$. In this manner a voltage will be developed by $R_{51}$ proportional to the signal current whereby the audio signal pulses, Figure 1d, are segregated from the combined received signal, Figures 1e or 1g. The segregated pulses are impressed through 53 upon a smoothing device J serving to produce the original audio signal X, Figure 1c, by eliminating all inaudible components. The smoothing filter shown is of standard design comprising a pair of series inductance elements $L_{54}$ and shunting condensers $C_{54}$. The audio signal is then applied in a known manner through line or coupling circuit 54 to an audio system P comprising an amplifier and reproducer such as a loud speaker.

Item K represents a second amplitude filter similar to the filter H but embodying a rectifier $D_{52}$ whose current passing direction is opposite to the current passing direction of the rectifier $D_{51}$ of the filter H in such a manner that current will pass through K as soon as the signal potential decreases below the voltage $E_2$ of the biasing battery in the manner shown in Fig. 2, resulting in a segregation of the video signals, Fig. 1b, from the composite received signals, Figs. 1b and 1g. The video signals are impressed across 55 upon an amplitude filter or clipping circuit L serving to segregate therefrom the synchronizing impulses $s_1$, $s_2$, $s_3$. ... The clipping circuit L is of standard design and in the example shown comprises a rectifier $D_{54}$ in series with a biasing battery and coupling resistance $R_{54}$ designed and operating in a manner well known in the art. The synchronizing impulses are applied to the deflecting or sweep potential generator or generators for synchronizing purposes in a manner well known in the art, while the remaining video signal is impressed through 55 upon an amplifier and image reproducer Q such as a cathode ray oscillograph. Figure 5 is to be regarded as an example only illustrative of a receiving system according to the invention and it is understood that the invention is susceptible of numerous other embodiments without deviating from the spirit and novel inventive principle. Thus, if the synchronizing impulses contrary to Figure 1 are of considerable amplitude while the audio signal pulses superimposed upon the video signals are of comparatively low amplitude, the amplitude filters H and K in Figure 5 should be interchanged as far as their operating characteristics are concerned.

If the synchronizing impulses and the audio signal pulses superimposed upon the video signals are in the same direction the characteristics of the amplitude filters have to be modified accordingly to afford a separation of the respective signals at the receiver. In case that the synchronising impulses and audio signal pulses have amplitudes differing from each other only to a small extent, a separation of both impulses by amplitude filters is no longer possible and other means have to be resorted to such as by the employment of an interrupting switch or relay as described in connection with Figures 3a to 3e. A receiving system of this type is shown in Figure 6 wherein item N represents the interrupting switch. In the example shown switch N comprises a movable arm or contact $S_{60}$ and an actuating winding $W_{60}$ controlled by a time base unit T supplying current impulses derived from the sweep oscillator of the receiver in a manner as shown and explained in reference to Figs. 3b and 3d. The combined signal transmitted directly or obtained by demodulation in G is impressed across 62 upon the interrupting or switching device N and applied alternately in the rhythm of the line frequency and across 67 to the sweep generator on the one hand and through 68 to the amplitude filters H and K on the other hand. In this manner the audio signal pulses and the remaining video signals are separated from each other in the manner described hereinabove. The audio signal pulses are then in turn transmitted through 63 to the smoothing device J and fed from the latter through 64 to the reproducer P. The remaining video signals are fed through 65 to the image reproducer Q in the manner similar to Figure 5.

The amplitude filters or clipping circuits H, K and L in Figures 5 and 6 may consist of arrangements of any type well known in television for segregating the synchronizing impulses. Such arrangements usually comprise devices with a bent operating characteristic and rectifiers operated with suitable biasing potentials. Basic arrangements of this type are described in "Elektrische Nachrichtentechnik" 1936, vol. 10, pg. 341 to 355. In view of the high frequencies to be dealt with it is advantageous to employ discharge tube rectifiers such as diodes. The smoothing device J, Figures 5, 6, may consist of a normal low-pass filter whereby the inaudible components of the discontinuous signal wave, Figures 1d or 1f, are eliminated. A suppression of these components is in general advisable in order to avoid excessive control of the audio frequency amplifier, although these frequencies may be suppressed by other means of the audio or other low frequency receiver such as by the coupling circuits of the amplifiers, loud speaker, etc.

It will be obvious from the foregoing that the low frequency signal X obtained in this manner is of considerably smaller amplitude compared with the peak values according to Figure 1d. Greater audio amplitudes may be obtained by means of a smoothing circuit shown in Figure 7a. According to the latter, the audio signal pulses $R_1$, $R_2$, $R_3$ . . . according to Figure 7b are impressed through terminals 71, 72 upon a rectifier 75 in series with a condenser 76. The condenser is charged sequentially to a potential corresponding to the peak value of each pulse $R_1$, $R_2$, $R_3$. . . . After the condenser has been charged it will discharge gradually through a resistance 77 placed in parallel thereto to a value which in any case is lower than the subsequent impulse potential. In this manner there is obtained a saw-tooth shaped potential $X_1$ as shown in Figure 7c the harmonic content of which is comparatively small compared with Figure 7b. The remaining harmonics are eliminated by means of a series inductance 78 and parallel condenser 79 forming a low-pass filter in such a manner as to obtain an output audio potential at terminals 73, 74 as indicated by the dashed line $X_2$ in Figure 7c. This output potential is then applied to the audio system or reproducer P.

It is to be pointed out that the signals according to Figure 1e may also be transmitted through a channel being impermeable for all frequencies below a definite limit, in particular a channel impermeable to the direct current component corresponding to the background illumination of the scene being televised. The lower video frequencies and the direct current component suppressed by such a transmitting channel may then be reconstructed at the receiver by utilization of the synchronizing impulses so as to obtain the complete original signal by employing a suitable restoring arrangement at points 52 or 62 in Figures 5 and 6, respectively. Suitable arrangements of this type for reconstructing the original signal after suppression of the low frequencies and direct current component are described for instance in the British patents 422,906 and 425,177.

As has been explained hereinbefore, it is possible in accordance with the invention to transmit the audio signal in the form of short pulses superimposed upon the video signal wave. It is furthermore to be regarded as coming within the scope of the present invention to transmit the low frequency video signals according to group 1 in the form of such signal pulses superimposed upon the high frequency video signals according to group 3 while transmitting the audio signals directly through the same channel. As is understood similar arrangements as shown in Figures 4, 5, 6 may be employed for carrying out this modification of the invention. For this purpose, the low video frequencies may be segregated at the transmitter by means of a low-pass filter and applied across 42 to the switching device D in an arrangement according to Figure 4. The high video frequencies are segregated by means of a high-pass filter and in turn applied through 41 to the switching device D together with the audio signals. The different frequency components may then be separated from the received signal in substantially the same manner as described in connection with Figure 5. The low video frequencies will be obtained at 54 and the high video frequencies and the audio signals may be derived from the output 55 of the filter K. The thus obtained signal may in turn be separated by a suitable filter whereupon the low and high video frequencies are combined and fed the image reproducer Q, while the audio frequencies are impressed upon the sound system P. In an analogous manner an arrangement according to Figure 6 may be employed at the receiver whereby the high video frequencies occurring at 65 are separated from the audio signal by means of a filter and impressed upon the image reproducer simultaneously with the low video frequencies derived from 64.

The representation of the low video frequencies by special signal pulses with direct transmission of the high video frequencies and the audio signals is furthermore possible by a modified arrangement of the type shown in the following Figures 8 to 16. According to the latter the audio signals are transmitted directly without any interruption while the high video frequencies are transmitted together with signal pulses having amplitudes or lengths characteristic of the momentary values of the low video frequencies.

There is shown in Figure 8a a television signal wave to be transmitted comprising both a low video frequency component below a definite limit frequency and constituting in their entirety a partial signal $y$ as shown in Figure 8b on the one hand and a high video frequency component including all frequencies above this limit frequency and constituting a partial signal as shown in Figure 8c. Thus, by superimposing the signals according to Figures 8b and 8c there is obtained the original signal according to Figure 8a.

In accordance with the present invention the low video frequencies, Figure 8b, are suppressed prior to the transmission whereby a portion of the transmitting channel becomes available for the simultaneous transmission of the audio signal. In order to effect a reconstruction of the low video frequency component in the receiver, the latter are represented and sent by individual signal pulses $R_1$, $R_2$, $R_3$ ... as shown in Figure 8d which pulses are combined with the high video frequency component in the manner shown in Figure 8e, an eventual remainder of audible frequencies of this signal being suppressed by a suitable high-pass filter. This high frequency signal may be combined with the audio signal X shown in Figure 8f for simultaneous transmission resulting in a combined signal as shown in Figure 8g the lowest frequency of which corresponds to the lowest audible frequency and the highest frequency of which corresponds to the highest video frequency produced by the scanning of the image to be transmitted. At the receiving end the audio frequency, Figure 8f, and the combined high video frequencies and signal pulses, Figure 8e, may be separated from each other by means of high-pass and low-pass filters in the manner well understood from the above. Systems for transmission and reception of video and audio signals according to the method illustrated by Figures 8a to 8g are shown diagrammatically in Figures 9 and 10, respectively.

Referring to Figure 9 relating to the transmitter, A represents collectively the scanning system or video signal generator and B represents the apparatus for producing the audio signal currents similar as described hereinbefore. $HP_1$ is a high pass filter and $TP_1$ a low-pass filter having identical cut-off frequencies. The video signal, Figure 8a, impressed across 96 is decomposed by these filters into a partial signal $y$ comprising the low video frequencies, Figure 8b, occurring at 92 and a partial signal comprising the high video frequencies, Figure 8c, occurring at 91.

Item C represents an impulse generator which may be similar to that shown in Fig. 4 producing a continuous sequence of electrical impulses following each other rapidly with a greater number thereof occurring during each scanning line of the image. These impulses are impressed upon the switching device D which may be similar to that shown in Fig. 4 across 93 whereby the high video frequencies are applied to the output 94 during the intervals between the impulses through high-pass filter $HP_1$ and line 91, while the lower video frequencies segregated by $TP_1$ and fed through 92 are transmitted to the output 94 during the short impulse periods. In this manner a combined signal will occur at 94 as shown in Figure 8e which signal practically contains no low frequencies in view of the extremely short connecting periods of the signal impulses, Figure 8d, representing the low video frequencies. If necessary, the remaining low frequency components of the signal at 94 may be eliminated by a second high-pass filter $HP_2$ having a cut-off frequency which is higher than the highest audio frequency to be transmitted. The thus obtained high frequency video signal may be combined with the audio signal produced by B for simultaneous transmission through the same channel, whereby the combined signal Figure 8g, at 97 is characteristic for all video as well as audio frequencies. This signal may be amplified to a sufficient extent and directly transmitted through a line or cable. Alternatively, it may serve to modulate a carrier wave for radio transmission. The modulator and transmitter which may be of known construction are represented by E in Figure 9. The high-pass filter $HP_1$ may be dispensed with in certain cases if the low frequencies are sufficiently suppressed by the filter $HP_2$.

Referring to Figure 10, there is shown a receiving system for cooperation with the transmitter shown in Figure 9. If transmission is effected by means of a modulated carrier wave the latter is demodulated by the device G. From the latter the demodulated signals having a shape according to Figure 8g are impressed through 102 upon two filters $TP_3$ and $HP_3$. The cut-off frequencies of these filters are adapted to the cut-off frequencies of the filters $TP_1$, $HP_1$, $HP_2$ of Fig. 9. Filter $TP_3$ serves to segregate the audio frequencies which latter are applied through 104 to the reproducer P. Filter $HP_3$ serves to segregate high frequencies thus obtaining a combined signal of the type shown at Figure 8e at terminals 108 which is similar to the one at 94 in Figure 9.

The upper limits of the short signal pulses $R_1$, $R_2$, $R_3$ ... form an enveloping curve $y$ representing the low video frequencies. These low video frequencies may be restored by separation of the impulses shown in Figure 8e by the aid of an amplitude filter H corresponding to the amplitude filter H in Figures 5 and 6 and subsequent smoothing in a device J substantially as described in Figures 5 and 6. Moreover, the high frequency video component which differs from Figure 8c merely by the additional short pulses of constant height which are without importance on the quality of the picture, may be obtained by a second amplitude filter K substantially in the same manner as shown in Figures 5 and 6. The thus obtained high and low video frequencies are then transmitted through 109 and to the reproducing device Q. If desirable, the amplitude filter K in Figure 10 may be avoided without materially affecting the quality of the picture.

It is understood that the short signal pulses characteristic of the low video frequencies as shown in Figures 8 to 10 may consist, contrary to Figures 8d and 8e, of signals having considerably lower amplitudes in comparison to the remaining signal. In this case, the amplitude filters H and K should be exchanged as regards their operating characteristics.

Furthermore, the low video frequencies may be characterised by the length of or the distance between signal pulses of constant light in the manner substantially analogous to the audio frequency signal pulses shown and described in connection with Figures 1f and 1g.

It will be further understood that synchronizing impulses may be transmitted simultaneously with the audio and video signals in a manner well known and understood from the above.

Referring to Figures 11a to 11e there is illustrated a further embodiment of the inventive method according to which the high video signal frequencies and the audio signal frequencies are transmitted directly while the low video frequencies are represented by signal pulses interposed within the high frequency video signals in the manner as described in connection with Figures 8a to 8g.

The video signal to be transmitted as shown in Figure 11a is combined with short pulses of constant duration and height as shown in Figure 11b. The low frequencies below a definite limit frequency of the thus obtained signal, Figure 11c, are shown at $y$ in Figure 11d. The frequencies above the same limiting frequency are segregated by a high-pass filter resulting in the signal shown in Figure 11e. By adding the two partial signals, Figures 11d and 11e, there is obtained the original signal, Figure 11c, with the enveloping curve of the peak values $P_1$, $P_2$, $P_3$ ... of the signal pulses forming a straight line. For this reason the enveloping line $—y$ in Figure 11e represents the negative value of the low frequency component, Figure 11d. The low video frequencies may be restored from the signal 11e by means of an amplitude filter segregating the signal values beyond a limiting line $E_7$. The signal, Figure 11, may be superimposed upon the audio signal for simultaneous transmission and the separation of the two signals carried out at the receiver in a manner substantially analogous to Figure 10. In this case, however, care should be taken that the intermediate pulses correspond to the negative partial signal $y$, Figure 11d, composed of the low video frequencies.

According to a simplified method the original video signals after segregation of the audio signals may be restored from the signals according to Figure 11e by an arrangement whereby a correcting potential is added to each pulse of the signal of such magnitude that the peaks of the pulses come to lie upon a straight line. Apparatus suited for this purpose is shown in Figures 14 and 16. In Figure 12 there is shown a principle system for carrying out the method described in connection with Figures 11a to 11e. The video signal generator or scanning device A, the sound generator B, impulse generator C, and the modulator and transmitter E correspond substantially to the arrangements according to Figures 4 and 9. The video signal, Figure 11a, is applied through 126 in Figure 12 to the switching device or interrupter D controlled by the impulses produced by the generator C which may be similar to that shown in Fig. 4 and is supplied through 123 in such a manner that during the intervals between the impulses the input 126 is in electrical connection with the output 124 of the interrupter, while during the short lengths of the impulses a determined constant potential ($P_1$, $P_2$, $P_3$ according to Figure 11c) is applied to the output 124. In this manner there is obtained a signal of the type shown in Figure 11c (full lines). The low frequencies of this signal are then suppressed by the aid of a high-pass filter HP$_2$ having a cut-off frequency higher than the highest audio frequency to be transmitted, whereby there is obtained at the output of this filter a signal as shown in Figure 11e. Upon this signal there are superimposed the sound frequencies supplied by B and the thus obtained combined signal transmitted through 127 directly to a transmission line or a transmitter E, respectively. The interrupter D may be an electron tube relay similar as described in connection with Figures 4 and 9.

The introduction of the signal pulses $P_1$, $P_2$, $P_3$ ... of constant amplitude may also be effected by means of a system according to Figure 13 wherein the reference numerals used correspond respectively to those in Figures 4, 9 and 12. In Figure 13, item T represents an amplitude filter serving to limit the upper amplitude of the signals transmitted to a definite maximum value or alternatively to limit the lower amplitude to a definite minimum value. The construction of this amplitude filter may be of the type similar to the filters H, K in Figures 5, 6 and 10. The output 136 of the generator or scanning device A is connected in series with the output 133 of the impulse generator C in such a manner that there occurs at 131 a potential equal to the sum of the video signal potential, Figure 11a, and the impulse potentials, Figure 11b, as shown by dotted lines in Figure 11c. The upper edges of the impulses of variable height are removed by the amplitude filter T, Figure 13, whereby there is obtained at 134 a signal according to Figure 11c (full lines) similar to the signal at terminals 124, Figure 12. The connection and operation of the remaining apparatus in Figure 13 is substantially identical to the arrangement of Figure 12. The combined video and audio signals obtained at 137 are similar to the combined signal at terminals 127 according to Figure 12.

As is understood, the impulses interposed in the video signals according to the arrangements of Figures 12 and 13 contrary to the foregoing description may be of negative character. In this case the amplitude filter T must be replaced by a transmission circuit having an operating characteristic as shown at 22 in Figure 2.

Referring to Figure 14 there is illustrated a system suited for receiving signals of the type according to Figure 11e. After demodulation in case of carrier transmission the received signals are impressed across input 142 upon a low-pass filter TP₃ and high-pass filter HP₃. In TP₃ the audio frequencies are segregated and applied across 144 to the reproducer P. The high-pass filter HP₃ serves to segregate the high frequency video signal, Figure 11e, from the combined received signal, the segregated signal being fed through 148 to a special rectifier M by which there is added to each pulse of the signal a potential of such magnitude that the peaks of the pulses come to lie upon a straight line. In this manner there is restored at 149 the original video signal, Figure 11c, in combination with constant pulses which signal is then impressed upon the image reproducer Q.

The circuit and operation of the rectifier M for reconstructing the low frequency and direct current component suppressed during the transmission may be similar to known arrangements such as described in British Patents 422,906 and 425,177. However, contrary to the methods described in these patents the rectifier in the case of the invention serves for restoring the lower video frequencies of the order of the line scanning frequency since all video frequencies coming within the range of the audible frequencies are transmitted indirectly with the audio signal occupying the respective portion of the transmitting channel. For this reason the lower video frequencies are characterized by special signal pulses following each other at a substantially higher sequence than the individual lines of the image or highest audio frequency. In designing the individual switching elements and the rectifying circuit M this fact should be considered by selecting a sufficiently small time constant. Such a rectifier circuit will be described presently in connection with Figure 16.

As is understood, it is furthermore possible in the arrangements according to Figures 12 to 14 to represent the lower signal frequencies by signal pulses directed downwardly in the oscillogram such as is possible also in arrangements according to Figures 9 and 10.

Referring to Figures 15 and 16 there is shown a complete transmission and receiving system, respectively, of the general type described by Figures 11, 13 and 14. Referring to Figure 15, the impulse generator C in the example illustrated comprises three vacuums $V_1$, $V_2$ and $V_3$ and a pair of diode rectifiers $D_1$ and $D_2$. The tube $V_1$ together with the inductances $L_1$, $L_2$ and condenser $C_1$ forms a regenerative oscillator of well known construction. This oscillator is energized by an anode battery $B_1$ and generates a sinusoidal alternating potential as shown in Figure 15a. This sinusoidal potential having a frequency which should be related to the line scanning frequency according to an undivided number, causes a potential as shown in Figure 15b to be applied to the grid of the tube $V_2$ through the coupling resistance $W_1$, whereby the upper half waves are suppressed due to the potential drop developed by the positive grid current through the resistance $W_1$. As a result, the anode current of tube $V_2$ is periodically interrupted in accordance with the negative half waves of the grid potential such as shown in Figure 15c. The alternating potential developed at the anode resistance $W_2$ which except for polarity and a constant factor corresponds substantially to Figure 15c causes a charging current for the comparatively small condenser $C_2$ through a comparatively small ohmic resistance $W_3$. This charging current and in turn the voltage drop across $W_3$ has a form as shown in Figure 15d. The same pulses will occur at the anode of the tube $V_3$.

The negative impulses are suppressed by the amplitude filter constituted by the diode rectifiers $D_1$ and $D_2$. $D_1$ is impermeable for the negative impulses while $D_2$ forms a short circuit for these impulses whereby the negative impulses at the output terminals 153 are eliminated. Moreover, $D_1$ passes the positive impulses while $D_2$ acts as a blocking device for the latter. The positive impulses are therefore transmitted at full strength to the output terminals 153. There is thus applied in series with the output 156 the video signal potential produced by the scanning device A an impulse potential in such a manner as to obtain at the input 151 of the amplitude filter T a video signal potential combined with signal pulses according to Figure 11c (dotted lines). The amplitude filter T may consist for instance of a diode $D_3$ in series with an ohmic resistance $W_5$ and a biasing battery $B_5$. As soon as the potential applied to the anode of $D_3$ through $W_5$ exceeds the positive potential of the battery $B_5$ a current starts to flow through this tube. This current causes a potential drop across resistance $W_5$ which latter prevents a rise of the potential at the anode beyond the battery potential. For this reason the portion of the impulses in the signal exceeding this counter-potential will be suppressed and there will be obtained at the output terminals 154 of the amplitude filter a signal potential as shown in Figure 11c (full lines). Subsequently, all low frequencies of this signal are suppressed by the high-pass filter HP₂ having a cut-off frequency which is higher than the highest audio frequency to be transmitted thereby obtaining a signal according to Figure 11e. To this signal there is then added at 157 the audio signal produced by the device B resulting in a combined signal to be transmitted at the output 155.

The impulse generator C and the amplitude filter T in Figure 15 are shown by way of example only. The same effects may be obtained by other known means without departing from the spirit of the invention. Thus the impulses, Figure 15b, may be generated from a sinusoidal alternating potential with the aid of saturated iron core choke coils or a relaxation oscillator or the like may be employed for this purpose.

In the arrangement according to Figure 15 no provision has been made for transmitting synchronizing impulses. It is understood that such impulses may be provided and transmitted in accordance with any one of the methods shown hereinbefore and well known to those skilled in the art.

Referring to Figure 16, there is shown a complete arrangement for receiving signals produced by a transmitter of the type according to Figure 15. If carrier transmission is employed the reveived signals are demodulated in G and impressed upon the input 162 in a manner well understood from the above. The low-pass filter TP₃ which may consist in a known manner for example of a pair of series inductances $L_{11}$ and $L_{12}$ and parallel condensers $C_{11}$ and $C_{12}$ serves to segregate the audio frequencies which latter are fed through 164 to the sound reproducer P. On the other hand, a high-pass filter HP₃ in the example shown consisting of series condensers $C_{13}$, $C_{14}$ and parallel inductances $L_{13}$, $L_{14}$ serves to segregate the video signal, Figure 11e, the latter being fed through 168 to the rectifier M. The latter in the example shown consists of a diode rectifier $D_{11}$ in combination with a series capacity $C_{15}$, shunt resistance $W_{11}$ to the diode and a pair of batteries $B_{11}$, $B_{12}$, the latter having equal voltages. If no input potential is impressed from the output 168, the output potential of the rectifier system at terminals 169 will be equal to the battery potential. If on the other hand a variable potential is impressed at 168 such as a potential corresponding to Figure 11e, voltage impulses will occur corresponding to the individual impulses at the rectifier in the current passing direction, setting up corresponding current impulses. By the latter the condenser $C_{15}$ is charged until the peaks of the impulses of the signal occurring at the output 169 are equal to the counter-potential provided by the battery $B_{11}$. As a result, the signal impressed at 168 will be displaced at the output 169 by a definite potential difference. The average potential at 169 is therefore smaller than the average potential at 168 and also lower than the potential of the battery $B_{12}$. For this reason a current will flow through resistance $W_{11}$ during the intervals between the impulses, which current will cause a slowing down of the charge of the condenser $C_{15}$ until this condenser is again charged by the succeeding impulse to such a value that the output potential or peak of the impulse is equal to the battery potential. The time constant of the resistance $W_{11}$ in combination with the condenser $C_{15}$ should be chosen in such a manner that each voltage variation due to the condenser discharge within the interval between two successive impulses is small in comparison with the average signal potential, whereby appreciable distortion of the image by the discharge current is avoided on the one hand, and that on the other hand the variation of the voltage takes place more rapidly than the greatest potential variation of the low video frequencies not being transmitted. In this manner each portion of the signal, Figure 11e, within two impulses may be displaced in such a manner that the signal at the output terminals 169 resembles with great approximation the original video signal, Figure 11c. In this manner, the low video frequencies suppressed before the transmission are restored by the rectifying arrangement M. The thus obtained video signal is then applied through 169 to the image reproducer Q.

In the transmission of the signal, Figures 11a to 11e, the peaks of individual impulses may be increased by momentary disturbances. As a result thereof, the subsequent line signal will be displaced causing disturbances in the brightness distribution of corresponding line. In order to keep this disturbance within minimum limits it is advisable to limit the current of the diode rectifier $D_{11}$ such as by the use of a tungsten cathode or by series connection of a special current limiting device known per se. The current limitation should be adjusted in such a manner that the maximum current is just sufficient for normal distortionless operation. For similar reasons the time constant of the capacity $C_{15}$ in combination with resistance $W_{11}$ should not be excessive.

As is understood, the arrangement and methods described in connection with Figures 8 to 16 may also serve principally for the direct transmission of both high and low video frequencies and transmission of the audio frequencies in the form of impulses in the manner described. In this case, referring to the transmitting arrangement according to Figure 9, the audio frequencies supplied by B are impressed through 92 upon the interrupter D while the low video frequencies derived from the filter $TP_1$ are directly transmitted through terminals 97 to the transmission system. In the receiver according to Figure 10 the audio frequencies supplied by J are impressed upon the sound reproducer P while the low video frequencies derived from $TP_3$ are transmitted through 109 to the image reproducer Q.

In the transmitters according to Figures 12, 13 and 15 there is provided at the output of the scanning device A a switch serving to directly apply the low video frequencies through 127, 137 and 157, respectively, to the transmission line or system while the high video frequencies are applied simultaneously with the audio frequencies supplied by B upon terminals 126, 136 and 156, respectively. In the receiver arrangements according to Figures 14 and 16, there is also provided a frequency switch at the output of the circuit M serving to apply the audio frequencies to the sound reproducer P while the high video frequencies are transmitted simultaneously with the low video frequencies supplied by $TP_3$ to the image reproducer Q.

A certain impairment of the image quality may take place due to a phase rotation of the individual components of the video signal. As is well known a considerable phase rotation dependent upon frequency may occur in electric filters in general in the neighborhood of the limiting or cut-off frequency. It is advisable therefore to choose as cut-off such frequencies as are contained to the least degree in the image signal or which are of lesser importance for the image quality. Thus, it is advantageous to choose a frequency differing from the line scanning frequency or a whole multiple thereof.

Disturbing phase rotation in the neighborhood of a sharply defined cut-off frequency may also be avoided by employing filters having a gradual cut-off in the neighborhood of the desired limiting frequency in place of filters with sharp cut-off characteristics. Finally, undesirable phase rotation may be compensated or corrected by the employment of suitable phase compensating networks or devices.

In summing up there have been described heretofore two basic embodiments of the invention. The short signal pulses transmitted together with the high frequency video signals may represent either the audio frequencies or the lower video frequencies. In the first case the lower video frequencies including a direct current component are directly transmitted for which purpose a transmitting circuit or channel is necessary capable of admitting the low frequency and direct current components. Alternatively the very low video frequencies (up to about $\frac{1}{10}$ of the line scanning frequency) and the direct current component are impressed upon the synchronizing impulses and restored from the latter in the known manner in which case transmission means permeable to direct current may be dispensed with. In the second case, the short impulses are used to represent the low video frequencies with the audio signal being transmitted directly, requiring a transmission channel ranging from the lowest audio frequencies to be transmitted (about 100 cycles) to the highest video frequency obtained as a result of scanning the image being transmitted.

It will be evident from the above that the invention is not limited to the steps and details described herein for illustration but that the underlying principle and inventive thought are susceptible of numerous embodiments and modifications coming within the broad scope and spirit of the invention as defined in the appended claims. The specification and drawings are accordingly intended to be regarded in an illustrative rather than a limiting sense.

I claim:

1. The method in television of transmitting sound and image signals which comprises producing and transmitting a series of signals representative of successive lines of the image, sequentially selecting at a frequency being an irrational multiple of the line scanning frequency and substantially exceeding the highest component sound frequency to be transmitted portions of energy representative of sound produced at discrete instances during the scanning of a line of the image, and instantaneously transmitting the selected sound impulses superimposed upon the image signals.

2. The method in television of transmitting sound and image signals which comprises producing and transmitting a series of signals representative of successively scanned lines of the image, sequentially selecting at a frequency being an irrational multiple of the line scanning frequency and substantially exceeding the highest component sound frequency to be transmitted portions of energy representative of sound produced at discrete instances during the scanning of a line of the image, changing the selected energy portions into signal impulses having a characteristic representative of the instantaneous amplitudes of said sound signals, and instantaneously transmitting the selected sound impulses superimposed upon the image signals.

3. The method in television of transmitting sound and image signals which comprises producing and transmitting a series of signals representative of successively scanned lines of the image, said signals having amplitudes varying between upper and lower levels according to the degrees of light and shade of successively scanned elemental areas within a line of the image, sequentially selecting at a frequency being an irrational multiple of the line scanning frequency and substantially exceeding the highest component sound frequency portions of energy representative of the sound produced at discrete instances during the scanning of a line of the image, changing the selected energy portions into signal impulses having a characteristic representative of the instantaneous amplitudes of the sound signals, and instantaneously transmitting the selected sound impulses within amplitude levels outside the amplitude range of said image signals.

4. The method in television of transmitting sound and image signals which comprises producing and transmitting a series of signals representative of successively scanned lines of the image, said signals having amplitudes varying between upper and lower limits according to the degrees of light and shade of successively scanned elemental areas within a line of the image, sequentially selecting at a frequency being an irrational multiple of the line scanning frequency and substantially exceeding the highest component sound frequency portions of the energy representative of the sound produced at discrete instances during the scanning of a line of the image, converting the selected energy portions into signal impulses having amplitudes representative of the instantaneous magnitudes of said sound signals, and instantaneously transmitting the selected sound impulses within amplitude limits outside the amplitude range of said image signals.

5. In a system for transmitting picture signals accompanied by related sound signals, means for scanning a picture along a series of substantially parallel lines to produce a series of picture signals having a characteristic varying between upper and lower levels according to the degrees of light and shade of successively scanned elemental areas during a line being scanned, means for sequentially selecting at a frequency being an irrational multiple of the line scanning frequency and substantially exceeding the highest component sound frequency to be transmitted portions of energy representative of the sound produced at discrete instances during the scanning of a line of the picture, means for converting the selected energy portions into impulse signals having a characteristic representative of the instantaneous magnitude of the sound signals, means for synchronously causing said picture signals to assume one of said amplitude levels during the occurrences of said signal impulses and superimposing said impulses upon the picture signals, and means for transmitting the superimposed sound impulses and picture signals.

6. In a system for transmitting picture signals accompanied by related sound signals, means for scanning a picture along substantially parallel lines to produce a series of picture signals the amplitude of which varies between upper and lower amplitude levels in proportion to the degrees of light and shade of successively scanned elemental areas within a line being scanned, means for sequentially selecting at a frequency being an irrational multiple of the line scanning frequency and substantially exceeding the highest component sound frequency to be transmitted portions of energy representative of the sound produced at discrete instances during the scanning of a line of the picture, means for converting the selected energy portions into signal impulses having magnitudes representative of the instantaneous amplitude of said sound signals, means for momentarily changing the picture signal amplitude to one of said amplitude levels during the occurrences of said sound impulses and synchronously and instantaneously superimposing said sound impulses upon said picture signals, and means for transmitting the superimposed sound impulses and picture signals.

7. In a system for transmitting picture signals accompanied by related sound signals, means for repeatedly scanning a picture along substantially parallel lines to produce a series of picture signals having amplitudes varying between upper and lower levels in proportion to the degrees of light and shade of successively scanned elemental areas within a line of the picture, means for sequentially selecting at a frequency being an irrational multiple of the line scanning frequency and the picture sequence frequency and substantially exceeding the highest component sound frequency to be transmitted portions of energy representative of the sound produced at discrete instances during the scanning of a line of the picture, means for converting the selected energy portions into sound impulses having a characteristic representative of the instantaneous magnitude of said sound signals, and means for instantaneously transmitting said sound impulses together with said picture signals through a single transmission channel and within amplitude levels outside the amplitude range of said picture signals.

8. A system for transmitting and receiving combined visual and audible signals comprising means at the transmitter for repeatedly scanning a picture along substantially parallel lines to produce a series of picture signals having amplitudes varying between upper and lower limits in proportion to the degrees of light and shade of successively scanned elemental areas within a line of the picture, means for sequentially selecting at a frequency being an irrational multiple of both the line scanning frequency and of the picture sequence frequency and substantially exceeding the highest component sound frequency to be transmitted portions of energy representative of the sound produced at discrete instances during the scanning of a line of the picture, means for converting the selected energy portions into sound impulses having a characteristic representative of the instantaneous magnitude of said sound signals, means for instaneously transmitting said sound impulses together with the picture signals through a single transmission channel and within amplitude levels outside the amplitude range of said picture signals, amplitude selective means at the receiver for segregating said sound impulses from the picture signals, and means for reconstructing the original sound signal from the segregated sound impulses.

9. The method in television of transmitting sound and image signals which comprises producing a series of image signals representative of successively scanned lines of the image, said sound signal representing a first audio frequency wave comprising a predetermined band of frequencies, said image signal including a second audio frequency wave comprising a frequency band equal to said first audio frequency wave and a high frequency wave comprising the image frequency components beyond said audio range, transmitting one of said audio frequency waves directly through a transmission channel together with said high frequency wave, sequentially selecting at a frequency being an irrational multiple of line scanning frequency and substantially exceeding the highest audio frequency component portions of energy of the other audio frequency wave produced at discrete instances during the scanning of a line of the image, converting the selected energy portions into signal impulses having amplitudes representative of the momentary magnitude of the respective audio frequency wave, and instantaneously transmitting said signal impulses superimposed upon said image signals.

10. The method in television of transmitting sound and image signals which comprises producing a series of image signals representative of successive lines of a repeatedly scanned image, said sound signals representing a first audio frequency wave comprising a predetermined band of frequencies, said image signals including a second audio frequency wave comprising a frequency band equal to said first audio frequency wave and a high frequency wave comprising the image frequencies beyond said audio frequency band, transmitting one of said audio frequency waves directly through a transmission channel together with said high frequency wave, sequentially selecting at a frequency being an irrational multiple of both the line scanning frequency and the image sequence frequency and substantially exceeding the highest audio frequency component portions of the energy representative of the other audio frequency wave at discrete instances during the scanning of a line of the image, converting the selected energy portions into signal impulses having a characteristic representative of the instantaneous magnitude of the respective audio frequency wave, and instantaneously transmitting said signal impulses through said transmission channel within amplitude limits outside the amplitude range covered by said image signals.

GUSTAV GUANELLA.